United States Patent [19]
Maclay

[11] 3,991,939
[45] Nov. 16, 1976

[54] SYSTEM FOR SPRAYING AND COOLING VEGETATION

[76] Inventor: William Richard Maclay, 16300 Lavender Lane, Los Gatos, Calif. 95030

[22] Filed: July 16, 1975

[21] Appl. No.: 596,423

[52] U.S. Cl. .................................. 239/63; 239/70; 137/78; 137/624.11
[51] Int. Cl.² .................. B05B 12/02; A01G 27/00
[58] Field of Search ................. 239/63, 64, 65, 70; 73/73; 324/61 P, 65 P; 137/78, 624.11

[56] References Cited
UNITED STATES PATENTS

| | | | |
|---|---|---|---|
| 2,611,643 | 9/1952 | Higgins | 239/64 |
| 2,737,615 | 3/1956 | Roby et al. | 239/63 X |
| 2,796,291 | 6/1957 | Mueller | 239/63 X |
| 2,812,976 | 11/1957 | Hasenkamp | 239/63 UX |
| 2,911,156 | 11/1959 | Freeman | 239/63 |
| 2,989,667 | 6/1961 | Swink | 239/63 X |
| 3,037,704 | 6/1962 | Kinigsberg et al. | 239/63 |
| 3,118,606 | 1/1964 | Rotunda | 239/63 |
| 3,182,914 | 5/1965 | Hosier | 239/63 |
| 3,195,816 | 7/1965 | Mercer | 239/63 |
| 3,590,335 | 6/1971 | Tetar | 239/64 X |

*Primary Examiner*—Robert S. Ward, Jr.
*Attorney, Agent, or Firm*—Gerald L. Moore

[57] ABSTRACT

Automated spraying system for misting and cooling vegetation, such as ornamental and food-producing plants, shrubs and crops. A sensor having a moisture evaporation rate similar to the particular vegetation and disposed among it forms part of a circuit that controls application of a cooling mist-like spray of water vapor to the vegetation whenever the moisture level drops below a preselectable value. The spray not only irrigates leaves and roots but also provides protection against damage to the leaves by insects and heat.

5 Claims, 2 Drawing Figures

SYSTEM FOR SPRAYING AND COOLING VEGETATION

BACKGROUND OF THE INVENTION

This invention relates to systems for improving the growing environment for ornamental and food-producing plants, shrubs and crops, and relates more particularly to systems automatically operable to apply a cooling irrigational spray of water vapor to such plants, shrubs or crops to maintain the moisture level substantially at a preselectable value.

Most ornamental and food-producing plants and crops thrive best in a cool, moist environment. Low humidity, excessive heat, drying winds, and a lack of root moisture inhibit growth. As a result, many of these plants and crops can be cultivated only in certain geographical areas where weather suits their requirements or where artificial means are provided to suitably modify local weather. For example, greenhouses are often used to increase temperature and humidity; but they are relatively expensive and, unless carefully controlled, invite plant disease due to stagnant air, tendency to overheat on sunny days or excessive moisture with resultant rot or fungus. If greenhouse ventilators are opened to reduce overheating and the wind is blowing, humidity is difficult to control.

It has heretofore been proposed to provide misting nozzles or watering sprays controlled by timers set to turn water supply on at a certain time for a preselectable period of time. This can result in overwatering or underwatering, depending upon the ambient conditions upon which this human judgment is superimposed. If the water thus applied is excessive, water is wasted and rot or fungus may occur. If the water is inadequate, root or leaf damage may result.

There is a need for a system that is automatically operative to provide irrigation of the flexible degree actually needed and at the same time so control the moisture level that damage to roots and leaves due to excessive or inadequate heat or moisture is substantially eliminated and insect damage is minimized.

SUMMARY OF THE INVENTION

Towards this end and according to the invention, a system is provided which irrigates plant and crop roots, protects their sensitive leaves from heat damage, minimizes the volume of water required for these purposes and at the same time discourages ravishing by insects.

It has been shown by actual test that many insects, such as the white fly, spider mites and aphids cannot thrive on plants that are cooled and sprayed or misted periodically by a system embodying the invention. The spray or mist appears to improve the health of the plants and gives them a chance to enhance their natural protective processes; periodic misting appears to disrupt the insects' life cycle and wash away their eggs and young insects. Spraying plants eliminates many insect pests; but insofar as is known, no system has heretofore been devised to control application of water vapor in the manner necessary to be effective. Poisons are widely used to control pests; but their use on the edible leaves of such plants as lettuce impose obvious risks on humans as well as to the environment — risks that are desirably eliminated if water is used effectively as an insecticide.

A principal object of this invention is therefore to provide a system for automatically spraying or misting plants to cool them and maintain a microclimate conducive to healthy growth by discouraging most insect pests and providing moisture for the root.

Another object is to minimize the care required for sensitive plants that can die quickly under conditions not sensed by a human caretaker in timely fashion.

A further object is to provide a system comprising controls that can readily be adjusted to optimize the growing conditions for any of a wide variety of plants and crops.

A still further object is to provide a system comprising a unique low-cost sensor that is simple and simulates the plant leaf in its rate of evaporation of moisture under all weather conditions to provide an input to the control circuitry reflecting the needs of the plant.

Other objects and advantages will become apparent from the following more detailed description of the invention and from the accompanying drawing.

DESCRIPTION OF PREFERRED EMBODIMENTS

Figure 1:
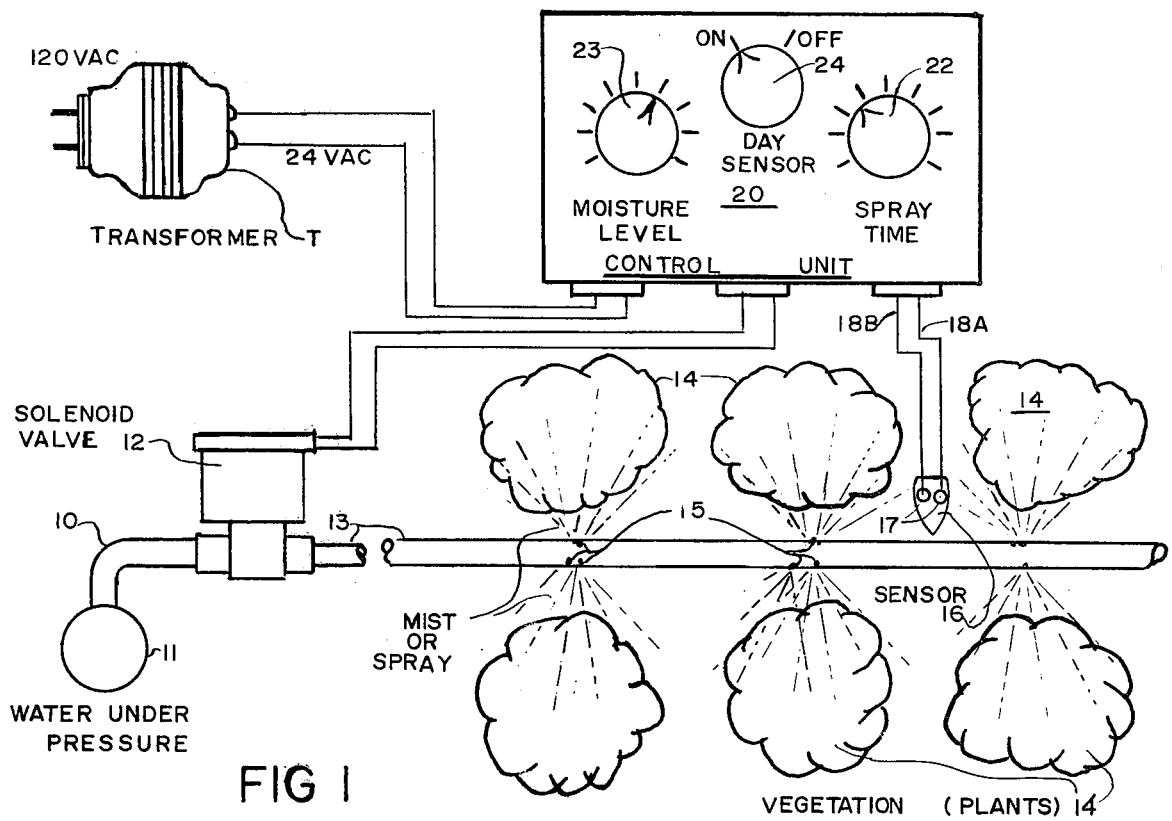
FIG. 1 is a schematic view of a system embodying the invention.

As illustrated in FIG. 1, the system embodying the invention comprises a conduit 10 for conveying water under pressure from a source 11 to a solenoid valve 12, whence it is conveyed by a conduit 13 to vegetation 14 (such as ornamental or food-producing plants, shrubs or crops) whose moisture level is to be controlled. Conduit 13 has nozzles or orifices 15 so located as to spray a cooling mist on the vegetation 14 when valve 12 is energized.

A sensor 16 is disposed in close proximity to the exposed leaves of the vegetation to sense moisture level. Sensor 16 comprises a body preferably of a material, such as unglazed ceramic, that has been found by actual test to have a resistance value that varies over a substantial range according to moisture level; however, other materials, such as fibers and wood, have been found to serve the desired purpose, though not as well.

A pair of small electrodes 17 pressed in the sensor body are of a metal that will not corrode or oxidize when exposed to tap water or weather. These electrodes would ideally be of gold or platinum but it has been found that costs can be substantially reduced without material sacrifice in operational efficiency by use of a commercially available fine wire alloy silver, gold, platinum, and palladium, such as Paliney No. 7 supplied by the J. M. Ney Co. of Hartford, Conn. These fine wire electrodes 17 are preferably clamped against the sensor body by nylon screws and nuts (not shown). The electrodes are then soldered to the respective strands 18A, 18B of copper wire, with the solder joints preferably being sealed in epoxy to protect against oxidation.

The other ends of strands 18A, 18B are connected to a control unit 20 that comprises control circuitry 21 (FIG. 2) controlled by sensor 16 for controlling energization of solenoid valve 12. Unit 20 includes a knob 22 rotatable for adjusting the period of time the misting spray continues after initial energization of valve 12. When the spray starts, it will wet the vegetation 14 and also sensor 16, causing valve 12 to become de-energized until the moisture level, as sensed by sensor 16, has reduced to a preselected value corresponding to the preadjusted position of a rotatable knob 23. Circuitry 21 also optionally includes a rotatable knob 24 having "on" and "off" positions for respectively cutting in a photocell 25 (FIG. 2) or a jumper lead 26 for preventing or permitting energization of valve 12 at night when misting might cause fungus on the particular vegetation or cause it to rot.

Figure 2:
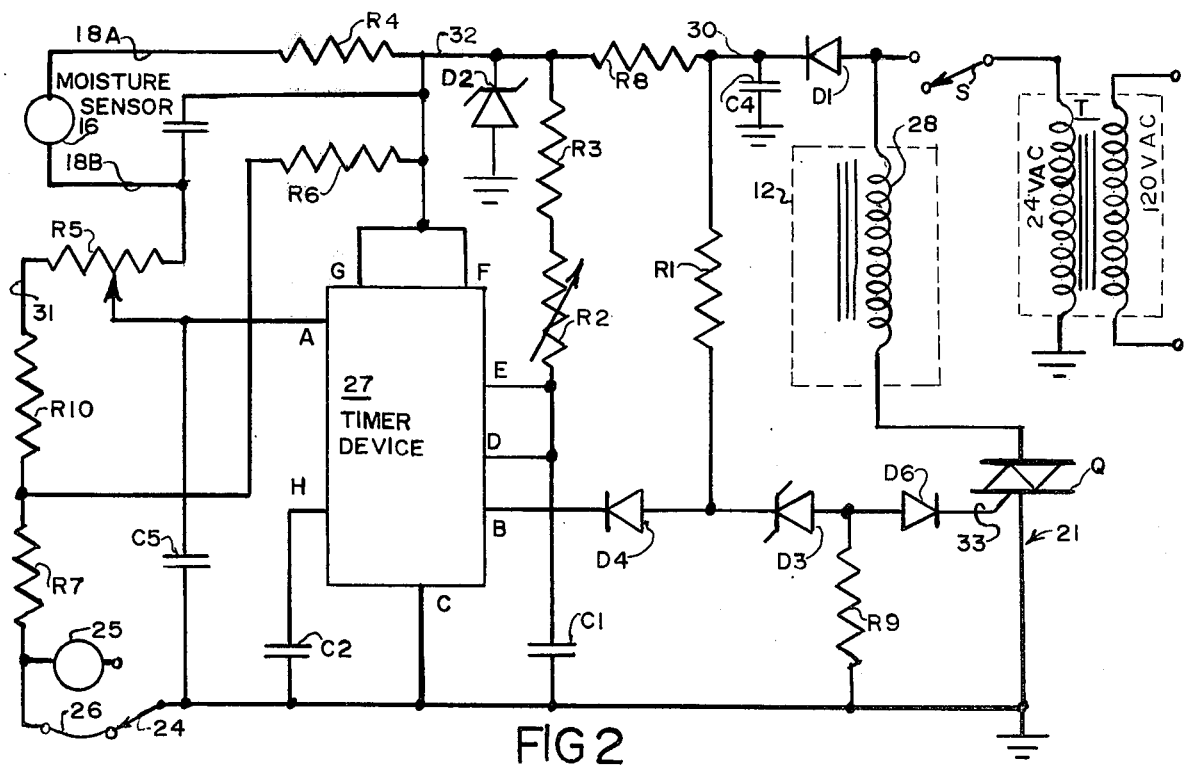
FIG. 2 is a circuit diagram of the control circuitry for said system.

As illustrated in FIG. 2, control circuitry 21 comprises a power supply section including a transformer T that converts, for example, 120 volt AC to 24 volt AC when a switch S is closed; a diode D1, for rectification; a filter capacitor C4; a voltage reducing sensor R8; and a zener diode D2 for fixing voltage level at, for example, 8.2 volts DC. Resistors R4, R6, R7, and R10 potentiometer R5 and sensor 16 forms a voltage divider network.

A timer device 27 is preferably of the type marketed by National Semiconductor Corporation, 2900 Semiconductor Drive, Santa Clara, Calif. 95051, and well known as a "555 timer". This device 27 comprises an integrated circuit with a fixed threshold at pin A. When voltage at pin A drops to a predetermined value (about two-thirds the illustrative 8.2 volt power supply voltage), timer device 27 will fire and cause capacitor C1 to charge at a rate controlled by a rheostat R2 and a resistor R3, causing a triac device Q to switch on for energizing coil 28 of solenoid valve 12. Triac device Q is a triode AC semiconductor switch of the type generally disclosed in U.S. Pat. No. 3275909. Triac device Q is triggered into conduction by a gate signal in lead 33 and conducts in both directions of current flow in response to a positive or negative gate signal.

Rheostat R2 is adjusted by knob 22 (FIG. 1) to preselect the spray time on each demand of sensor 16 for water; whereas potentiometer R5 is adjusted by knob 23 to preselect the magnitude of resistance of sensor 16 (and hence moisture level) at which solenoid valve 12 will be energized and initiate spraying.

Forward biased diodes D3, D4, and D6 steer the current flowing through a current limiting resistor R1. The current sinks through pin B of timer device 27 except when capacitor C1 is charging. The remaining capacitors C2, C3, and C5 are noise filters.

When sensor 16 is wet, the voltage at pin A of timer device 27 is high: This holds pin B near ground potential so no current can reach triac device Q through diodes D3 and D6. In this condition the voltage at pin E of timer device 27 is low which holds capacitor C1 near ground potential. Resistor R9 bleeds leakage current through diode D3 to ground when pin B of timer device 27 is near ground potential, thereby to prevent inadvertent switching of triac device Q into conduction. When not illuminated, photocell 25 (if active) has a very high resistance (more than a megohm). As a result, the voltage at night at pin A of timer device 27 approaches the same value as the power supply line 32; hence triac device Q and solenoid valve 12 will remain de-energized, with the result that no spray will occur until the sun comes up (or a strong light hits photocell 25).

In operation, assume potentiometer R5 and rheostat R2 have been adjusted by knobs 23 and 22 to respectively preselect the moisture level at which valve 12 will operate to initiate the spray and to preselect the period of time the spray will continue once initiated. Assume further that knob 24 is in off position to connect jumper 26.

When switch S is closed, transformer T and diode D1 will provide the desired direct current power supply voltage between a line 30 and ground, which voltage is reduced by resistor R8 to a preselected lower operating value, such as 8.2 volts, on line 32. Current will flow through resistor R6 to the common connection with resistors R7 and R10 which are preselected to establish a voltage at point 31 slightly greater than one-third of the 8.2-volt reference on line 32, when sensor 16 is very wet and therefore at its minimum resistance. (This insures that the spray will not continue after the sensor 16 is wet, for reasons hereafter explained). Current also flows down through resistor R4 and through sensor 16 and continues through potentiometer R5 and resistor R10 in series and joins with current from resistor R6 and flows through resistor R7 to ground. Resistor R4 is preselected to insure that the voltage at point 18B will always be greater than one-third of the 8.2-volt reference on line 32 when the sensor is wet; but the primary function of resistor R4 is to present impedence to noise which will pass through capacitor C3 and diode D2 to ground.

The values of resistors R6, R4, R10, and R7 and potentiometer R5 are preselected to insure that when sensor 16 is wet the wiper of potentiometer R5 and pin A of timer device 27 will be at a voltage greater than one-third of the 8.2 volts on line 32, which will hold pin B of timer device 27 near ground potential. Current flowing through resistor R1 will pass through the single diode drop of diode D4 to ground into timer device 27 through a conducting transistor inside the timer device 27 and out to ground from pin C of said timer device. Capacitor C1 is held discharged through another conducting transistor which provides a path to ground between pins E and C internal of timer device 27.

As sensor 16 dries, its resistance increases and voltage at the wiper of potentiometer R5 and at pin A of timer device 27 decreases until it reaches about one-third of the 8.2-volt reference on line 32; whereupon a flip-flop internal to the timer device 27 is set. The alternate position of the flip-flop releases the short circuit across the capacitor C1 through pin E of timer device 27 and drives the output high at pin B of the timer device so no current can flow to ground. Current flowing out of resistor R1 must then overcome an increase of about 5.7 volts through the additional voltage drop of zener diode D3, diode D6, and triac device Q. This causes current to flow into gate lead 33 of triac device Q which conducts current in both directions and energizes coil 28 for opening solenoid valve 12 and hence initiating the spray.

Assume now that the spray has been initiated. When sensor 16 becomes moist, resistance across electrodes 17 decreases and voltage at pin A rises, but this is without effect until capacitor C1 is charged through resistor R3 and rheostat R2 to about two-thirds of the 8.2-volt power supply at line 32 when the flip-flop internal to timer device 27 resets. The actual delay time in the charging of capacitor C1 is determined by the setting of rheostat R2 by knob 22. When capacitor C1 becomes charged, a comparator internal to said timer device 27 and connected to pin D thereof causes the flip-flop of timer device 27 to reset, whereupon capacitor C1 discharges through pin E and drives pin B to near ground potential. Through a reversal of the previously described steps, the current from resistor R1 takes the lower potential path to ground through pin B of timer device 27, flows through diode D3 and drops to near zero, and the leakage current through said diode flows through resistor R9 to ground; whereupon triac device Q, lacking control current, becomes non-conducting, de-energizing solenoid coil 28 and thus closing valve 12 until sensor 16 again dries and causes resistance to increase to the preselected value determined by the setting of knob 23.

Pin G of timer device 27 is connected to the flip-flop internal to said timer device 27 to provide means to reset said flip-flop on command. Such function, not being desired in this application, is de-activated by connection to the 8.2-volt power supply line 32.

It should be noted that control circuitry 21 has successfully controlled solenoid valves 12 used with pipe up to 1-inch diameter, and hence is practical for large commercial installations. In such cases, nozzles 15 can be prelocated in rigid pipe conduit 13. Circuitry 21 has also been used to control solenoid valves 12 connected to one-fourth inch flexible plastic tubing strung around or over plants. In such a case, the orifices or nozzles 15 can be formed at discrete locations desired by perforating the tubing with a tapered punch (not shown). The taper of the perforate orifices 15 as well as their spacing will control the mist or spray pattern and density of droplets. Either a very fine mist or a course spray can be obtained by the choice of the perforating tool.

It should also be noted that the resistance between the electrodes 17 varies according to the moisture condition of the porous ceramic body of sensor 16. When the sensor body is saturated with water, resistance across electrodes 17 will be relatively low, (e.g., 100,000 ohms or less); but as the sensor body dries out, resistance increases progressively to as much as several hundred megohms. The ratio of the body surface of sensor 16 to its volume determines the rate of change of resistance under a fixed set of conditions. However, the ratio of body surface to volume is relatively non-critical because the magnitude of resistance change is very substantial and circuitry 21 can be adjusted to suit a wide variety of humidity level and misting spray requirements.

The response of moisture sensor 16 can be modified by photocell 25. As above noted, photocell 25 can, at night when light intensity is very low, introduce so much resistance in the control circuitry 21 that the moisture demand of the sensor 16 is overridden and energization of valve 12 thus prevented. This is desirable when the system is used to control spraying of plants or crops whose leaves are susceptable to fungus if wet at night but benefit from spraying or misting in hours of sunlight. Photocell 25 assures that solenoid valve 12 provides the spray only during daylight hours.

It should additionally be noted that when the orifices or nozzles 15 are small to cause the water under pressure to be expelled from conduit 13 as a misting spray, the droplets evaporate quickly. It has been found by actual test that sensor 16 is sensitive enough to respond very quickly to subtle changes in relative humidity, and thus maintains moisture level within narrow limits.

While the invention has been shown and described with reference to a preferred embodiment thereof, it will be apparent that the foregoing and other variations may be made in the automated spraying system without departing from the spirit, scope and teaching of the present invention. Accordingly, the system herein disclosed is to be considered merely as illustrative, and the scope of the invention is to be limited only as specified in the claims.

The invention claimed is:

1. An automated system for spraying and cooling vegetation, said system comprising:
   means for conveying a cooling spray of water vapor to the vegetation,
   valve means operative to release said cooling spray in response to an energizing signal, and
   control circuit means for regulating said valve means, comprising in combination,
   a moisture sensor including a chemically inert body having a porous outer surface for absorbing moisture to the interior thereof and having a moisture absorption and evaporation rate approximating that of the vegetation,
   a pair of precious metal electrodes fixed in spaced relationship within the interior of said chemically inert body,
   a detection circuit for detecting the electrical conductivity between said electrodes and for supplying an energizing signal to said valve means when said conductivity changes beyond a predetermined limit, and
   means to support said porous moisture sensor above ground level and in close proximity to the vegetation whereby it will absorb water from the spray during the time the valve means is operative to release spray and dry out at a rate corresponding to that of the vegetation to control the moisture delivered to the vegetation.

2. A system according to claim 1, including means for adjusting said predetermined conductivity limit.

3. A system according to claim 1, including adjustable time delay means for conditioning said valve means to continue to release said spray for a selectable period of time after it is energized by said signal to its spray releasing condition.

4. A system according to claim 1, wherein said control circuit means comprises:
   light responsive means having a resistance that increases as light intensity decreases and operative to render said control circuit means ineffective to energize said valve means to its spray releasing condition when light intensity is below a preselected magnitude.

5. A system according to claim 1, wherein said moisture sensor comprises:
   a porous unglazed ceramic body and electrodes of a gold-silver-platinum-palladium alloy secured to said body.

* * * * *